(12) United States Patent
Yamasaki

(10) Patent No.: US 9,022,092 B2
(45) Date of Patent: May 5, 2015

(54) TWO-STAGE INTERLOCKED SLIDING DOOR FOR MACHINING TANK OF ELECTRIC DISCHARGE MACHINE

(71) Applicant: Fanuc Corporation, Yamanashi (JP)

(72) Inventor: Mizuho Yamasaki, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 26 days.

(21) Appl. No.: 13/849,821

(22) Filed: Mar. 25, 2013

(65) Prior Publication Data

US 2013/0298467 A1    Nov. 14, 2013

(30) Foreign Application Priority Data

May 9, 2012  (JP) .................................. 2012-107753

(51) Int. Cl.
| | |
|---|---|
| *E05D 15/00* | (2006.01) |
| *E05B 65/04* | (2006.01) |
| *B23K 9/00* | (2006.01) |
| *E05D 13/00* | (2006.01) |
| *B23H 7/36* | (2006.01) |
| *B23H 11/00* | (2006.01) |
| *E05D 15/48* | (2006.01) |
| *B23H 1/10* | (2006.01) |

(52) U.S. Cl.
CPC . *E05D 13/00* (2013.01); *B23H 1/10* (2013.01); *B23H 7/36* (2013.01); *B23H 11/00* (2013.01); *E05D 15/48* (2013.01)

(58) Field of Classification Search
CPC ......... E05D 15/08; E05D 15/18; E05D 15/48; B23Q 11/0825; B23H 1/00; B23H 7/00; B23H 11/00; B23H 1/10; E05F 15/145; E05Y 2900/602; E05Y 2900/606

USPC .............. 160/197, 202, 222–225; 219/69.11, 219/69.14, 69.17; 49/125, 323, 372, 374, 49/378, 360
See application file for complete search history.

(56) References Cited

U.S. PATENT DOCUMENTS

| | | | | | |
|---|---|---|---|---|---|
| 1,439,373 | A | * | 12/1922 | Maier et al. ..................... | 49/102 |
| 2,425,016 | A | * | 8/1947 | Weaver .......................... | 49/102 |
| 5,078,234 | A | * | 1/1992 | Lin .............................. | 184/106 |
| 5,264,676 | A | | 11/1993 | Kanaya et al. | |

(Continued)

FOREIGN PATENT DOCUMENTS

| | | |
|---|---|---|
| JP | 288116 A | 3/1990 |
| JP | 5162018 A | 6/1993 |

(Continued)

OTHER PUBLICATIONS

Decision to Grant a Patent mailed Jul. 2, 2013 corresponds to Japanese patent application No. 2012-107753.

*Primary Examiner* — Katherine Mitchell
*Assistant Examiner* — Jeremy Ramsey
(74) *Attorney, Agent, or Firm* — Lowe Hauptman & Ham, LLP

(57) ABSTRACT

A door for attachment on the front of a machining tank of an electric discharge machine includes a door frame and first and second lifting doors that move up and down with respect to the door frame. When the first lifting door is lifted, pulleys attached on the first lifting door also move up, causing a belt wound around the pulleys and fixed to the door frame via a first belt-attaching member to rotate. As a result, the second lifting door, fixed to the belt via a second belt-attaching member, moves up with respect to the first lifting door.

4 Claims, 7 Drawing Sheets

(56) References Cited

U.S. PATENT DOCUMENTS

| | | | |
|---|---|---|---|
| 5,290,987 A * | 3/1994 | Davis et al. | 219/69.11 |
| 5,401,931 A * | 3/1995 | Hori | 219/69.12 |
| 5,447,468 A * | 9/1995 | Tener et al. | 454/58 |
| 6,923,238 B2 * | 8/2005 | Kern et al. | 160/197 |
| 6,987,241 B2 * | 1/2006 | Hacker et al. | 219/121.86 |
| 8,272,179 B2 * | 9/2012 | Mangelsen et al. | 52/239 |
| 2004/0011479 A1 * | 1/2004 | Bissolo | 160/223 |
| 2013/0327744 A1 * | 12/2013 | Matsumoto et al. | 219/69.11 |

FOREIGN PATENT DOCUMENTS

| | | |
|---|---|---|
| JP | 6-055349 A | 3/1994 |
| JP | 71240 A | 1/1995 |
| JP | 1177435 A | 3/1999 |
| KR | 2010070427 A * | 6/2010 |

\* cited by examiner

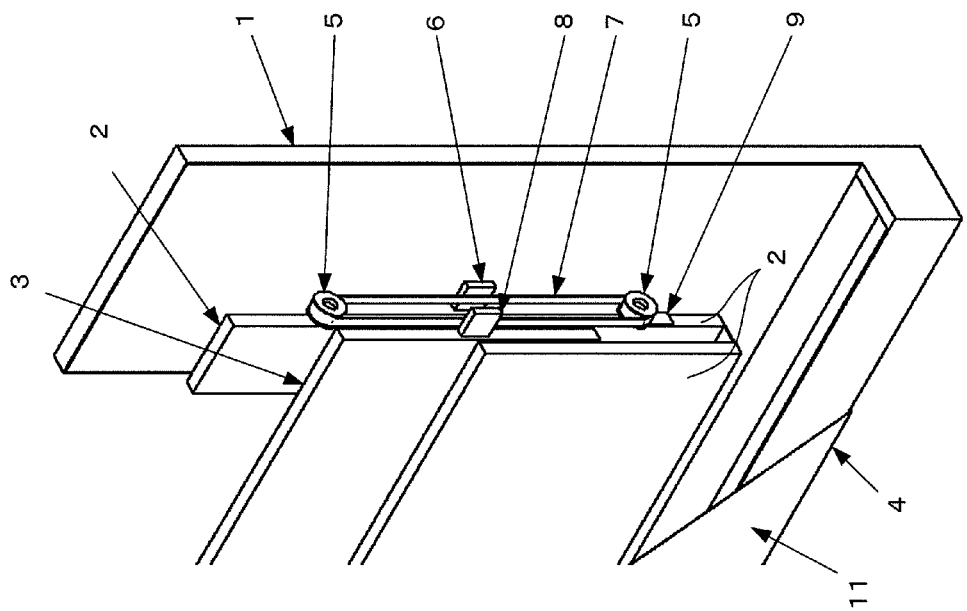
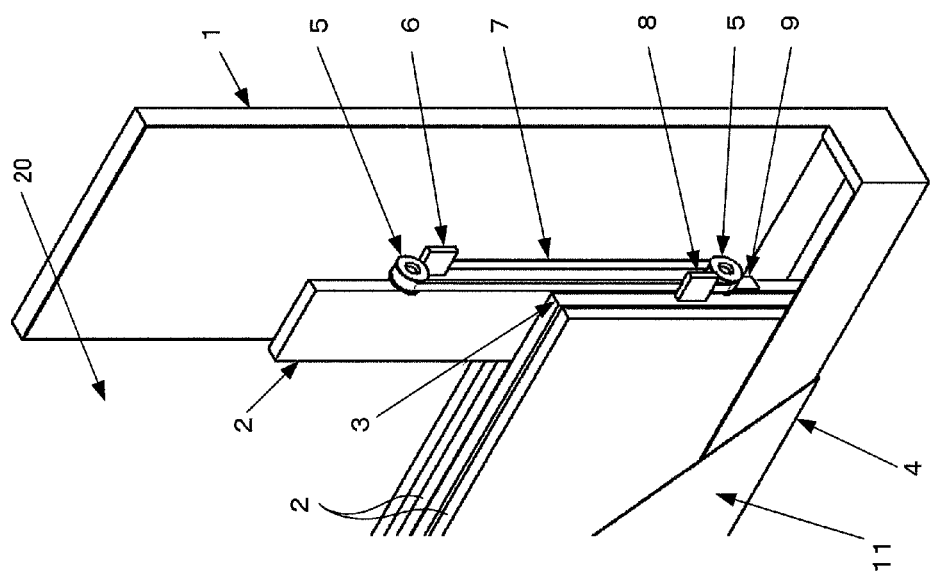

TWO-STAGE INTERLOCKED SLIDING DOOR FOR MACHINING TANK OF ELECTRIC DISCHARGE MACHINE

RELATED APPLICATIONS

The present application is based on, and claims priority from, Japanese Application Number 2012-107753, filed May 9, 2012, the disclosure of which is hereby incorporated by refrence herein in its entirety.

BACKGROUND OF THE INVENTION

1. Field of the Invention

The present invention relates to a two-stage sliding door for a machining tank of an electric discharge machine.

2. Description of the Related Art

In a typical electric discharge machine, a workpiece is fixed in a machining tank containing machining fluid and undergoes electric discharge machining in a state where the workpiece is immersed in the machining fluid. The machining tank has a lifting door on its front that moves up and down with respect to a door frame for facilitating removal of a processed workpiece from the machining tank and setting of a workpiece into the machining tank from outside. A simplest conventional structure of such a machining tank is described below with reference to FIGS. 9 to 11.

As illustrated in FIG. 9, a door 11 attached to the front of the machining tank includes a door base member 1 serving as a door frame, first and second lifting doors 2 and 3 that move up and down with respect to the door base member 1, a door cover 4 serving as a fixing cover, and a driving mechanism (not shown) for lifting and lowering the second lifting door 3. The first lifting door 2 is formed of two planar members of different heights disposed in front of each other at a certain spacing. The taller planar member has an opening formed in a center thereof, and the upper ends of the left and right portions except the center are folded forward so as to form stoppers 10. The shorter planar member has a height up to the opening in the taller planar member. The second lifting door 3 is formed of a single planar member having the same height as the shorter planar member of the first lifting door 2, and is fitted between the two planar members forming the first lifting door 2. The door base member 1 has an opening 20 formed in the center thereof. The opening 20 is not closed by the first and second lifting doors 2 and 3 when the first and second lifting doors 2 and 3 are at the lowered position, in which the second lifting door 3 is fitted between the two planar members forming the first lifting door 2, as illustrated in FIG. 9.

When the second lifting door 3 is lifted by the driving device from the position shown in FIG. 9, the second lifting door 3 gets out from between the two planar members forming the first lifting door 2 and the upper end of the second lifting door 3 abuts against the stoppers 10 of the first lifting door 2. When the second lifting door 3 is further lifted, the first lifting door 2 also moves up with the second lifting door 3 and the opening 20 on the front of the door base member 1 is closed by the first and second lifting doors 2 and 3 as shown in FIG. 11. Thus, the machining fluid in the machining tank is maintained at a high level.

With this structure, however, in order to close the opening 20 in the door base member 1 with the first and second lifting doors 2 and 3, the driving device needs to drive the first and second lifting doors 2 and 3 with the same stroke. Additionally, because load on the driving device varies when the second lifting door 3 comes into contact with the stoppers 10 of the first lifting door 2, control to keep the lifting speed of the second lifting door 3 constant is difficult. Furthermore, there is a risk of a hand of an operator present near the machining tank door 11 getting caught when the lifting second lifting door 3 comes into contact with the stoppers 10 of the first lifting door 2.

Japanese Patent Application Laid-Open No. 6-55349 discloses a machining tank of a wire electric discharge machine that includes a base container member, first and second movable container members, and an elevator for sliding the first and second movable container members in cooperation with each other up and down with respect to the base container member. With this machining tank, side walls of the base container member are partially open to a point lower than the top surface of a table on which a workpiece is secured. When the elevator is driven to slide the first and second movable container members in cooperation with each other upward with respect to the base container member, the opening portion in the side walls of the base container member is closed, forming a machining tank surrounded by high side walls on all of the four sides. When the elevator is driven to slide the first and second movable container members in cooperation with each other downward with respect to the base container member, the first and second movable container members are fitted into the base container member such that the first and second movable container members are nested. As a result, the side walls of the machining tank descend to a position lower than the top surface of the table on which a workpiece is fixed, so workpiece replacement can be easily done over the lowered side walls, i.e., removing the workpiece from the table outside the machining tank or setting a workpiece on the table. However, since a pantograph driving mechanism is employed in the elevator, which slides the first and second movable container members in cooperation with each other up and down with respect to the base container member, the structure of the elevator is complicated, leading to the problem of increase in the number of components and/or assembly time.

SUMMARY OF THE INVENTION

The present invention addresses the above problems of the prior art technique with the object of providing a two-stage interlocked sliding door having a lifting mechanism with pulleys and a belt, for a machining tank of an electric discharge machine.

The two-stage sliding door for a machining tank of an electric discharge machine according to the present invention includes a door frame, a first door that is fitted in the door frame and moves over a predetermined stroke, and a second door that moves over a stroke longer than the stroke of the first door, the second door is fitted inside the first door, and the first door is fitted between a fixing cover and the door frame. The sliding door further includes: two pulleys, one of which being disposed at an upper part of a side surface of the first door and the other one being disposed at a lower part of the side surface of the first door; an endless belt wound around the two pulleys; and first and second fixing members respectively attached to the door frame and the second door and fixing the belt. A part of the belt on one side of the straight line connecting the centers of rotation of the two pulleys is fixed to the first fixing member attached to the door frame, and a part of the belt on the other side is fixed to the second fixing member attached to the second door.

The two pulleys may be disposed either on only one of left and right side surfaces of the first door or on both of the left and right side surfaces.

The entire portion of the two-stage interlocked sliding door may be made openable and closable with respect to the machining tank by fixing one edge of the door frame to a hinge and fixing one side of the hinge to the machining tank.

The ends of a shaft rotatably supporting each of the pulleys may be respectively affixed to left and right vertical boards attached to an edge of the second door.

According to the present invention, it is possible to provide a two-stage interlocked sliding door having a lifting mechanism with pulleys and a belt, for a machining tank of an electric discharge machine.

BRIEF DESCRIPTION OF THE DRAWINGS

The forgoing and other objects and feature of the invention will be apparent from the following description of preferred embodiments of the invention with reference to the accompanying drawings, in which:

FIG. 2 is a partial perspective view showing the two-stage sliding door for a machining tank of an electric discharge machine according to a first embodiment of the present invention;

FIG. 3 is a partial perspective view showing the first and second lifting doors of FIG. 2 which are in the process of moving up/down in cooperation with each other;

DETAILED DESCRIPTION OF THE PREFERRED EMBODIMENTS

First Embodiment

Figure 1:
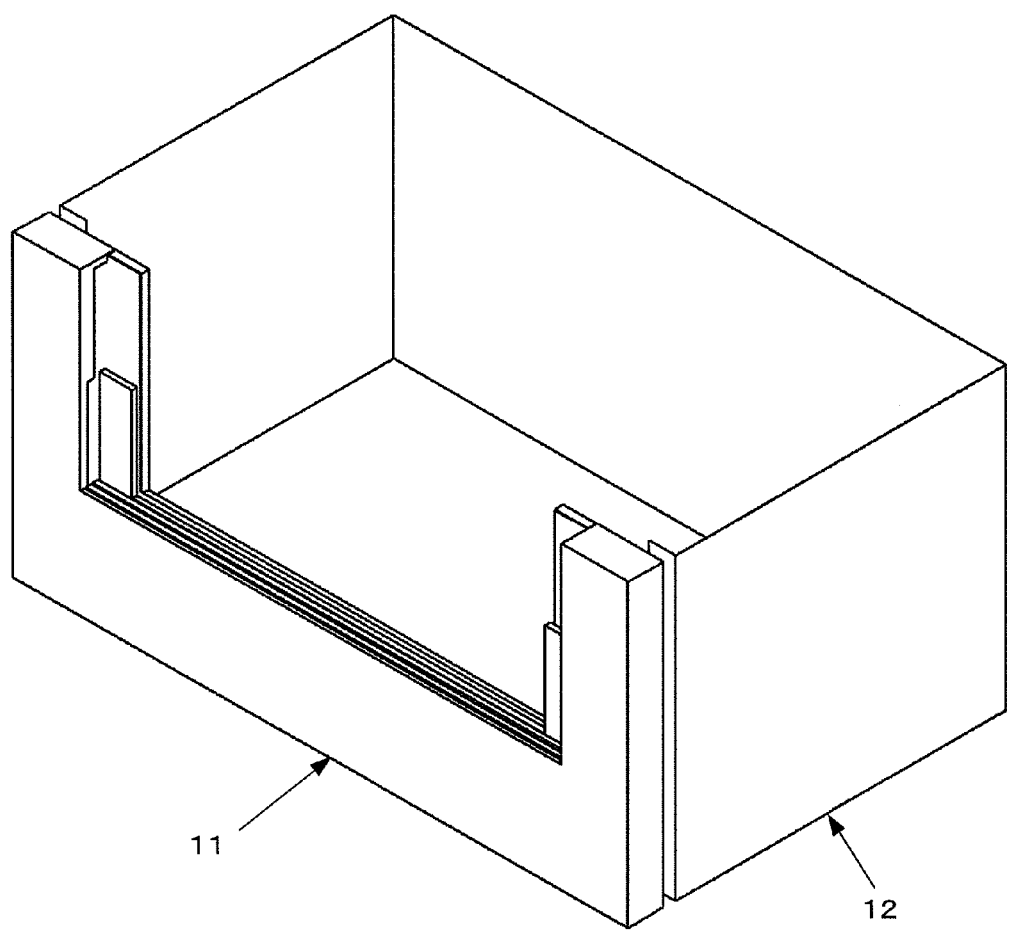
FIG. 1 is a perspective view of a machining tank of an electric discharge machine having a two-stage interlocked sliding door.

FIG. 1 is a perspective view of a machining tank of an electric discharge machine having a two-stage interlocked sliding door. A machining tank door 11 is attached to the front of a machining tank 12.

FIG. 2 illustrates the two-stage sliding door for a machining tank of an electric discharge machine according to a first embodiment of the present invention.

As shown in FIG. 2, the door 11 for attachment on the front of the machining tank 12 shown in FIG. 1 includes a door base member 1 serving as a door frame, first and second lifting doors 2 and 3 that move up and down with respect to the door base member 1, a door cover 4 serving as a fixing cover, and a driving mechanism (not shown) for lifting and lowering the second lifting door 3.

The first lifting door 2 is formed of two planar members of different heights disposed back and forth at a certain spacing. The taller planar member has an opening formed in a center thereof, while the shorter planar member has a height up to the opening in the taller planar member. The second lifting door 3, which is formed of a single planar member, is fitted between the two planar members forming the first lifting door 2. The height of the planar member forming the second lifting door 3 is substantially the same as the height of the shorter planar member forming the first lifting door 2.

The door base member 1 has an opening 20 formed in the center thereof. The opening 20 is not closed by the first and second lifting doors 2 and 3 when the first and second lifting doors 2 and 3 are at the lowered position, as shown in FIG. 2.

Pulleys 5, 5 are attached at upper and lower parts of one end surface of the taller planar member forming the first lifting door 2. Around the pulleys 5, 5, an endless belt 7 is wound. A first belt-attaching member 6 is fixed at a part of the belt 7 on one side of the straight line connecting the centers of rotation of the upper and lower pulleys 5, 5, and a second belt-attaching member 8 is fixed at a part of the belt 7 on the other side. The first belt-attaching member 6 is fixed to the door base member 1 and the second belt-attaching member 8 is fixed to the second lifting door 3. The tension of the belt 7 is controlled by increasing the distance between the upper and lower pulleys 5, 5 with a belt tension adjustment member 9.

When the first lifting door 2 is lifted through driving of a driving device (not shown), the pulleys 5, 5 attached to the first lifting door 2 also move up as shown in FIG. 3, and in turn the endless belt 7 wound around the pulleys 5, 5 and fixed to the door base member 1 via the first belt-attaching member 6 rotate. Consequently, the second lifting door 3 fixed to the belt 7 via the second belt-attaching member 8 moves up with respect to the first lifting door 2, on which the pulleys 5, 5 are attached (that is, the second lifting door 3 gradually gets out upward from between the two planar members forming the first lifting door 2). Thus, while the movement of the second lifting door 3 takes place in cooperation with the movement of the first lifting door 2, the travel (stroke) of the second lifting door 3 is half the travel (stroke) of the first lifting door 2.

Figure 4:
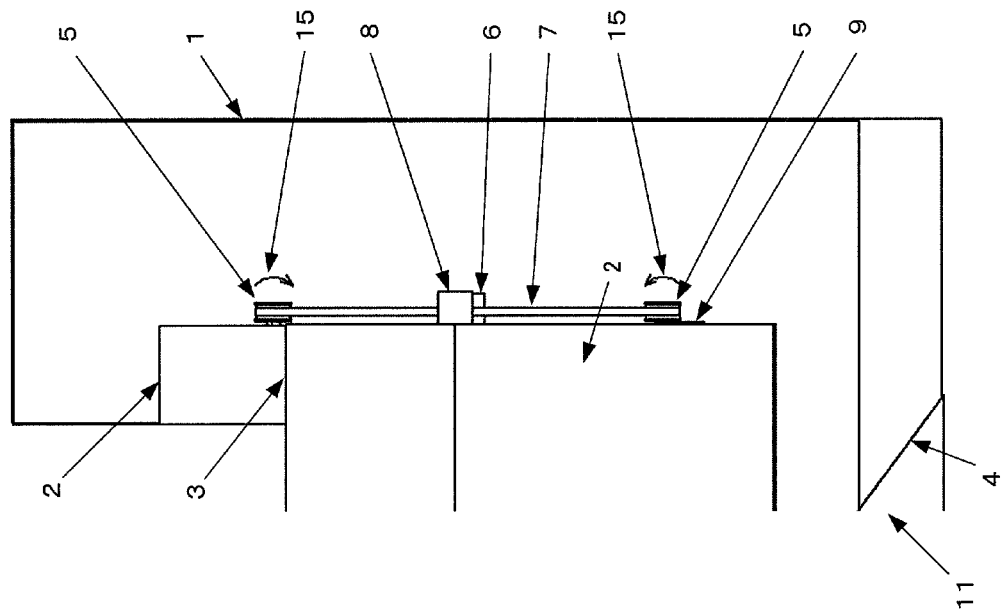
FIG. 4 is a partial perspective view showing a state in which the first and second lifting doors of FIG. 2 have been completely lifted and an opening formed in a door base member is closed by the first and second lifting doors.

FIG. 4 shows that the first lifting door 2 has reached the uppermost position through driving of the driving device. In this position, most part of the second lifting door 3 has gotten out upward from between the two planar members forming the first lifting door 2, and the second lifting door 3 and the first lifting door 2 close the opening 20 formed in the door base member 1.

Figure 9:
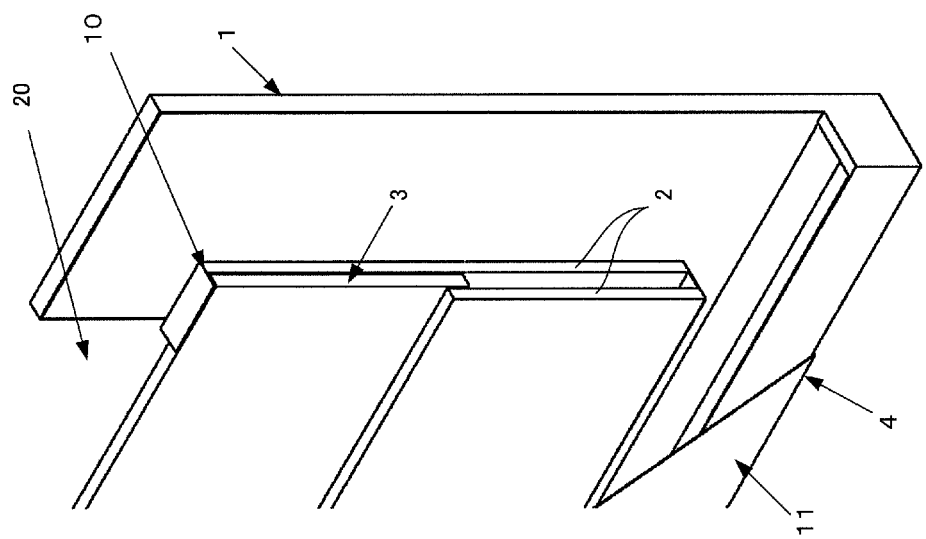
FIG. 9 shows the structure of a conventional sliding door forming the machining tank of an electric discharge machine.
Figure 10:
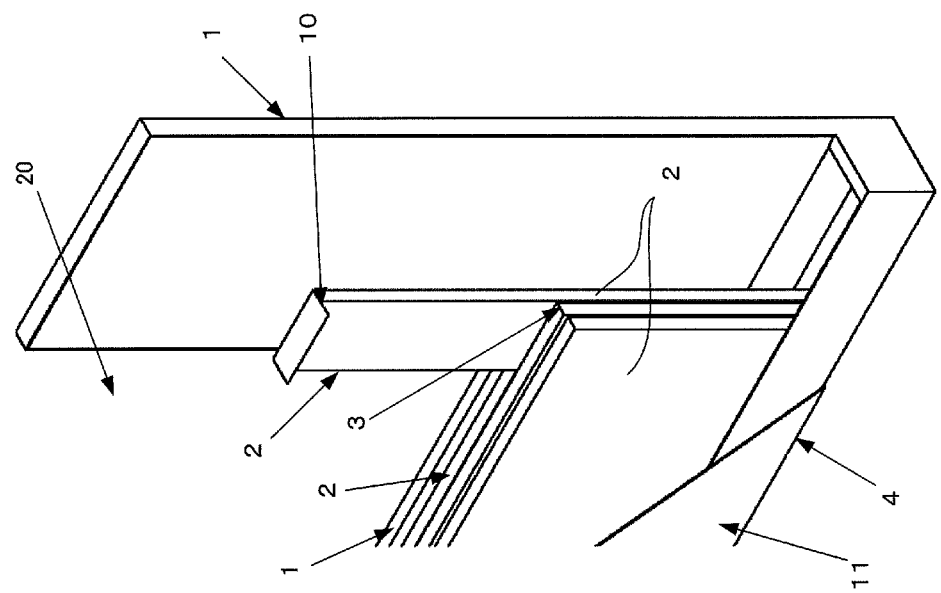
FIG. 10 shows the sliding door shown in FIG. 9 which is in the process of moving up.
Figure 11:
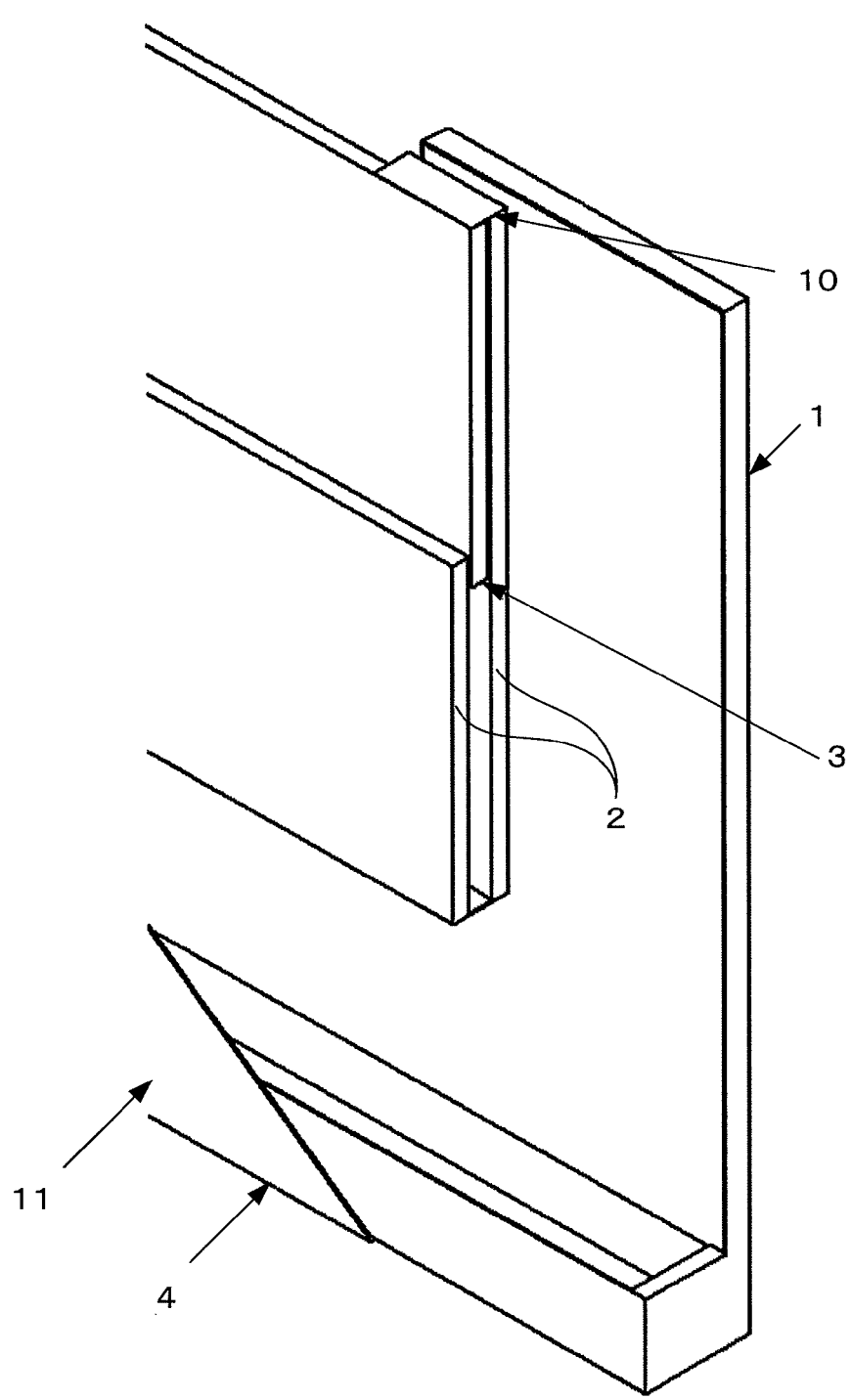
FIG. 11 shows a state in which the sliding door shown in FIG. 9 has been completely lifted and the opening formed on the front of the machining tank is closed by the sliding door.

As described above, the two-stage interlocked sliding door for a machining tank according to the present invention can achieve the closed state of the door 11 illustrated in FIG. 4 by lifting the first lifting door 2 with a stroke half that of the second lifting door 3. Also, since the force (load) necessary for lifting the first lifting door 2 (and the second lifting door 3 in cooperation with each other) with the driving device is invariant regardless of the position of the first lifting door 2 (and the second lifting door 3), the speed of lifting and lowering the first lifting door 2 (and the second lifting door 3) with the driving device can be easily controlled at a constant speed. Moreover, since it is not necessary to form the stopper 10 on the first lifting door 2 for regulating the elevation of the second lifting door 3 as in the prior art technique (see FIG. 9), there is no risk of a hand or the like of the operator getting caught between the second lifting door 3 and the stopper 10.

Although the pulleys 5, 5 are attached at upper and lower parts of the right end surface of the first lifting door 2 in the example shown in FIGS. 2 to 4, the pulleys 5, 5 may be attached at upper and lower parts of both of the left and right end surfaces of the first lifting door 2.

Second Embodiment

Figure 5:
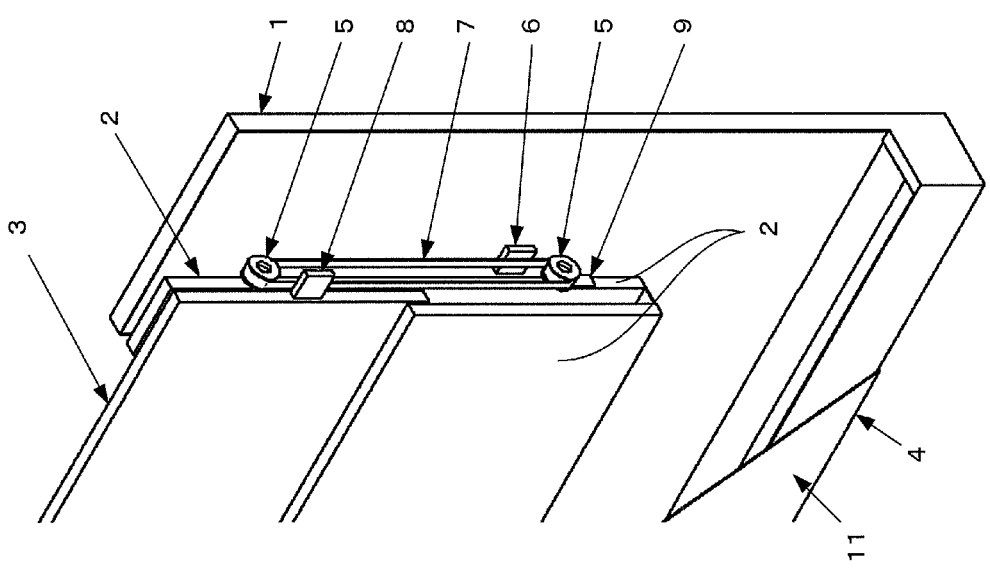
FIG. 5 is a partial front view of the sliding door as viewed from its front with the first and second lifting doors in the position of FIG. 3.

FIG. 5 is a front view showing a state in which the first and second lifting doors 2 and 3 are moving up/down, indicating that the weight of the second lifting door 3 is applied to the belt 7 via the second belt-attaching member 8 and consequently moments shown at reference numeral 15 in FIG. 5 associated with the load of the belt 7 act on the pulleys 5. The moments 15 acting on the pulleys 5 can cause deformation or distortion in shafts rotatably supporting the pulleys 5 and/or their bearings (not shown), possibly resulting in deflection of the belt 7 and/or malfunction of the first and second lifting doors 2 and 3.

Figure 7:
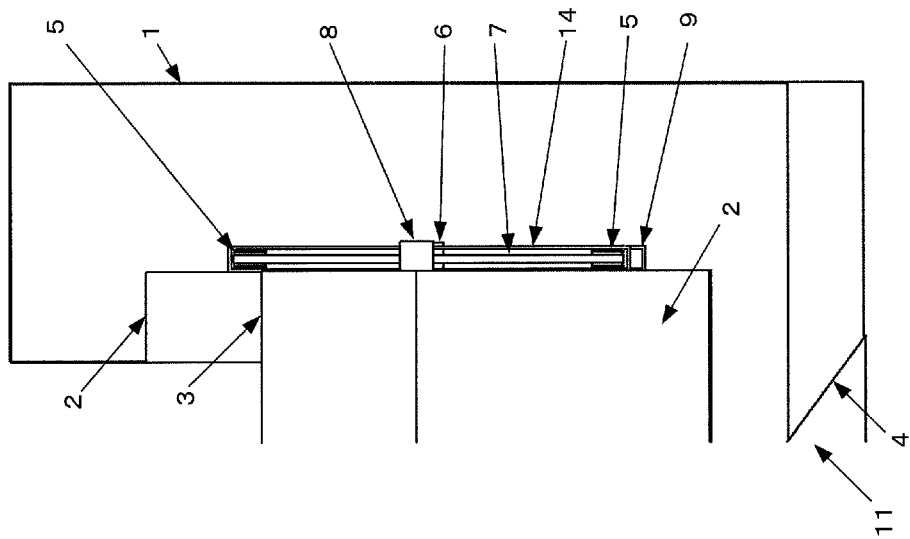
FIG. 7 is a partial front view of the sliding door shown in FIG. 6 as viewed from its front.
Figure 6:
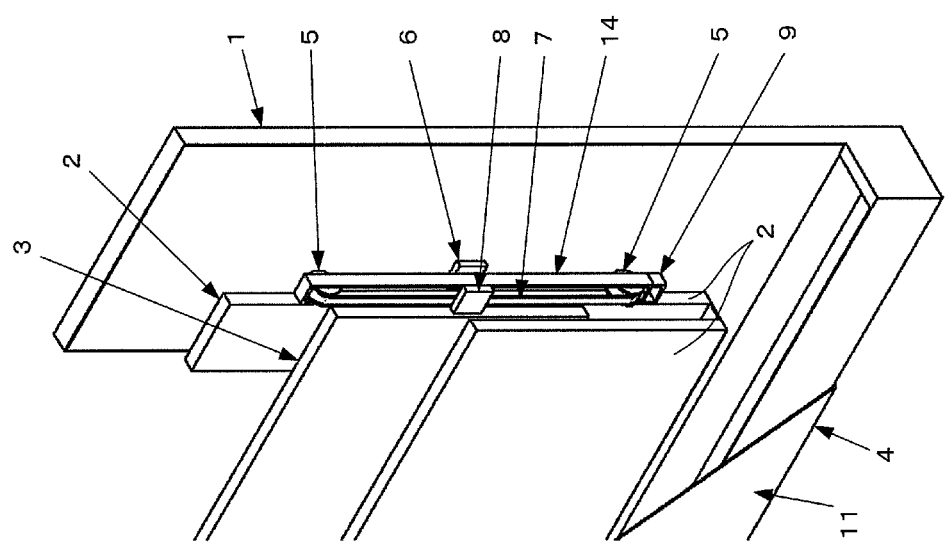
FIG. 6 is a partial perspective view showing the two-stage sliding door for a machining tank of an electric discharge machine according to a second embodiment of the present invention.

In order to solve this problem, a pulley holding member 14 having a shape of an elongate bottomless box such as shown in FIGS. 6 and 7 is attached to the first lifting door 2, and the pulleys 5, 5 are affixed to the pulley holding member 14. The pulley holding member 14 is shaped in an elongate bottomless box formed of left and right two long vertical boards, and upper and lower short horizontal boards respectively connecting the upper and bottom edges of the vertical boards. The shafts of the pulleys 5 are attached between the left and right vertical boards. With this structure, the shafts of the pulleys 5 are supported at both of their left and right ends by the left and right side boards that form the pulley holding member 14, not in a cantilevered manner as shown in FIG. 5. This eliminates deformation or distortion in the shafts supporting the pulleys 5, 5 and/or their bearings that can be caused by the weight of the second lifting door 3 applied to the belt 7 via the second belt-attaching member 8.

Third Embodiment

Figure 8:
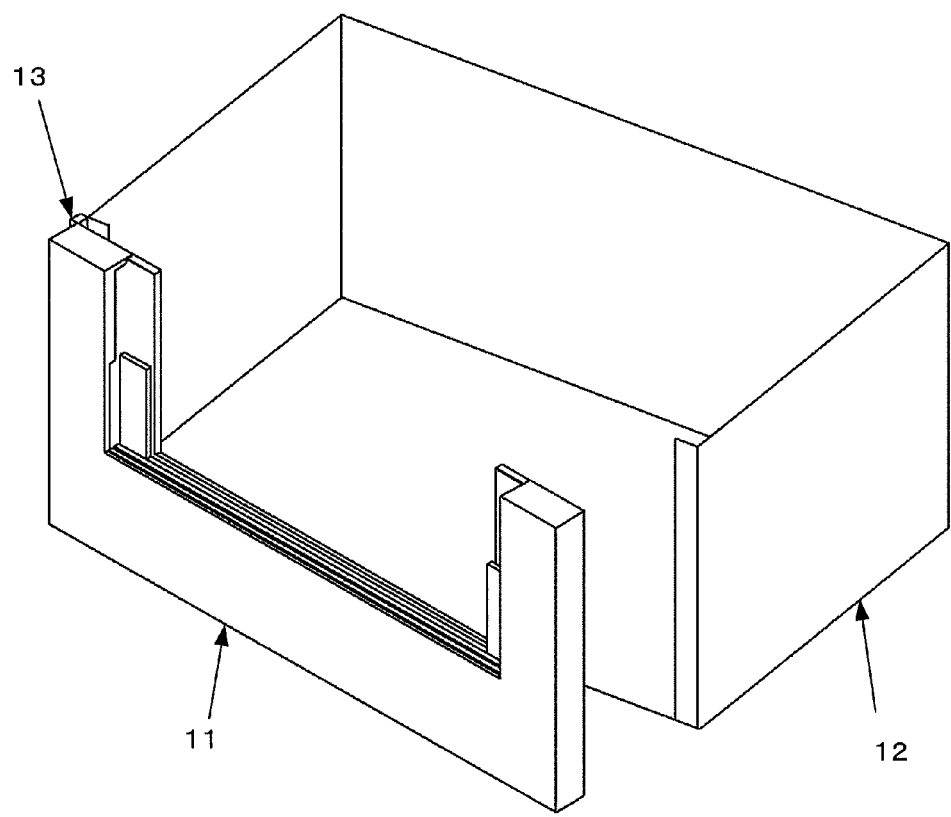
FIG. 8 is a perspective view showing the two-stage sliding door for a machining tank of an electric discharge machine according to a third embodiment of the present invention.

By connecting the machining tank door 11 and the machining tank 12 with a hinge 13 as illustrated in FIG. 8, the entire portion of the machining tank door 11 can be opened, improving the accessibility of the machining tank to the operator.

The invention claimed is:

1. A two-stage interlocked sliding door for a machining tank of an electric discharge machine, which comprises a door frame, a first door that is fitted in the door frame and moves over a predetermined stroke, and a second door that moves over a stroke longer than the stroke of the first door, the second door being fitted inside the first door, and the first door being fitted between a fixing cover and the door frame, the two-stage interlocked sliding door further comprises:

a first pulley which is disposed at an upper part of a side surface of the first door and a second pulley which is disposed at a lower part of the side surface of the first door;

an endless belt wound around the first and second pulleys; and first and second fixing members attached to the door frame and the second door, respectively, and fixing the belt; wherein a part of the belt on one side of a straight line connecting centers of rotation of the first and second pulleys is fixed to the first fixing member attached to the door frame, and a part of the belt on another side is fixed to the second fixing member attached to the second door, and the first door comprises a first planar member and a second planar member, and wherein the first planar member and the second planar member are spaced from each other such that the second door is fitted between the first planar member and the second planar member.

2. The two-stage interlocked sliding door for a machining tank of an electric discharge machine according to claim 1, wherein the first and second pulleys are disposed either on only one of left and right side surfaces of the first door or on both of the left and right side surfaces.

3. The two-stage interlocked sliding door for a machining tank of an electric discharge machine according to claim 1, further comprising:

a hinge fixed to one edge of the door frame, the hinge configured to be fixed to the machining tank such that an entirety of the two-stage interlocked sliding door is pivotable with respect to the machining tank.

4. The two-stage interlocked sliding door for a machining tank of an electric discharge machine according to claim 1, wherein the ends of a shaft rotatably supporting each of the first and second pulleys are respectively affixed to left and right vertical boards attached to an edge of the first door.

\* \* \* \* \*